(12) United States Patent
McPheeters

(10) Patent No.: US 9,742,350 B2
(45) Date of Patent: Aug. 22, 2017

(54) SOLAR PANEL GROUNDING LUG ASSEMBLIES AND SYSTEMS

(71) Applicant: Sunrun South LLC, San Luis Obispo, CA (US)

(72) Inventor: Greg McPheeters, Santa Cruz, CA (US)

(73) Assignee: Sunrun South LLC, San Luis Obispo, CA (US)

( * ) Notice: Subject to any disclaimer, the term of this patent is extended or adjusted under 35 U.S.C. 154(b) by 0 days.

(21) Appl. No.: 14/672,455

(22) Filed: Mar. 30, 2015

(65) Prior Publication Data

US 2015/0280334 A1    Oct. 1, 2015

Related U.S. Application Data

(60) Provisional application No. 61/971,977, filed on Mar. 28, 2014.

(51) Int. Cl.
| | | |
|---|---|---|
| H02S 40/34 | (2014.01) | |
| H01R 4/30 | (2006.01) | |
| H01R 4/34 | (2006.01) | |
| H01R 4/64 | (2006.01) | |

(52) U.S. Cl.
CPC .............. *H02S 40/34* (2014.12); *H01R 4/305* (2013.01); *H01R 4/34* (2013.01); *H01R 4/646* (2013.01)

(58) Field of Classification Search
CPC ... H01R 4/44; H01R 4/38; H01R 4/40; H01R 4/42; H01R 4/46; H01R 4/34

USPC .................................................. 439/781, 782
See application file for complete search history.

(56) References Cited

U.S. PATENT DOCUMENTS

| | | | | | |
|---|---|---|---|---|---|
| 812,287 | A | * | 2/1906 | Nagel | H01R 4/44 |
| | | | | | 140/51 |
| 3,019,282 | A | * | 1/1962 | Husted | H01R 4/40 |
| | | | | | 174/146 |
| 3,026,497 | A | * | 3/1962 | Myers | H01R 4/40 |
| | | | | | 403/391 |
| 3,050,706 | A | * | 8/1962 | Kitscha | H01R 13/115 |
| | | | | | 439/781 |
| 3,068,445 | A | * | 12/1962 | Crowther | H01R 4/34 |
| | | | | | 403/391 |
| 3,081,507 | A | * | 3/1963 | Gribble | H01R 4/40 |
| | | | | | 403/389 |
| 3,085,223 | A | * | 4/1963 | Toedtman | H01R 4/40 |
| | | | | | 403/391 |
| 3,141,722 | A | * | 7/1964 | Nielsen | F16B 43/00 |
| | | | | | 439/782 |
| 3,144,506 | A | * | 8/1964 | Gunthel, Jr. | H01R 4/38 |
| | | | | | 174/138 F |
| 3,148,086 | A | * | 9/1964 | Seibert | H01B 1/023 |
| | | | | | 174/94 R |
| 3,173,741 | A | * | 3/1965 | Crowther | H01R 4/34 |
| | | | | | 403/391 |

(Continued)

*Primary Examiner* — Ross Gushi
(74) *Attorney, Agent, or Firm* — Kramer Levin Naftalis & Frankel LLP

(57) ABSTRACT

Solar panel grounding lug assemblies and systems are disclosed. The grounding lugs may include a top member having a grounding wire channel and an aperture, a bottom member having an aperture, and a fastener inserted through the apertures. The fastener may couple the top member to the bottom member and secure a grounding wire within the grounding wire channel.

10 Claims, 3 Drawing Sheets

(56) References Cited

U.S. PATENT DOCUMENTS

| | | | | |
|---|---|---|---|---|
| 3,177,456 A * | 4/1965 | Haydu | H01R 4/34 | 24/135 R |
| 3,191,140 A * | 6/1965 | Coldren | H01R 4/34 | 439/782 |
| 3,205,473 A * | 9/1965 | Crowther | H01R 4/34 | 184/15.1 |
| 3,238,495 A * | 3/1966 | Lanius, Jr. | H01R 4/40 | 403/390 |
| 3,238,496 A * | 3/1966 | Crowther | H01R 4/34 | 403/390 |
| 3,248,684 A * | 4/1966 | Hubbard | H01R 4/44 | 403/391 |
| 3,398,393 A * | 8/1968 | Cochrum | H01R 4/40 | 439/782 |
| 3,470,526 A * | 9/1969 | Joly | H01R 4/34 | 439/723 |
| 3,509,521 A * | 4/1970 | Gutshall | H01R 4/26 | 403/389 |
| 3,553,351 A * | 1/1971 | Lindsey | H01B 17/22 | 174/169 |
| 3,657,683 A * | 4/1972 | Grieshaber | H01R 4/44 | 439/781 |
| 3,683,318 A * | 8/1972 | Them | H01R 4/34 | 439/431 |
| 3,688,246 A * | 8/1972 | Toedtman | H01R 4/2483 | 439/412 |
| 3,824,555 A * | 7/1974 | Klein | H01R 4/62 | 439/782 |
| 3,891,296 A * | 6/1975 | Gutshall | H01R 4/34 | 439/782 |
| 3,924,920 A * | 12/1975 | Moscioni | H01R 4/646 | 439/781 |
| 3,993,397 A * | 11/1976 | Gutshall | F16B 39/24 | 411/160 |
| 4,014,504 A * | 3/1977 | Sachs | H02G 7/08 | 174/43 |
| 4,021,094 A * | 5/1977 | Hild | H01R 4/34 | 439/733.1 |
| 4,097,112 A * | 6/1978 | Veldman | H01R 4/34 | 439/782 |
| 4,123,132 A * | 10/1978 | Hardy | F16B 39/24 | 411/337 |
| 4,131,257 A * | 12/1978 | Sterling | F16L 3/2235 | 24/335 |
| 4,135,777 A * | 1/1979 | Barth | H01R 4/34 | 439/782 |
| 4,146,289 A * | 3/1979 | Kirrish | H01R 4/44 | 439/431 |
| 4,174,148 A * | 11/1979 | Obuch | H01R 4/34 | 411/160 |
| 4,269,464 A * | 5/1981 | Veldman | H01R 4/44 | 439/782 |
| 4,273,408 A * | 6/1981 | Orr | H01R 9/2491 | 439/709 |
| 4,293,176 A * | 10/1981 | Lindlof | H01R 4/44 | 439/413 |
| 4,310,214 A * | 1/1982 | Carlson | H01R 4/44 | 439/781 |
| 4,461,521 A * | 7/1984 | Sachs | H01R 4/646 | 174/41 |
| 4,471,159 A * | 9/1984 | Frank, Jr. | H01R 4/44 | 174/94 R |
| 4,492,422 A * | 1/1985 | Bieschke | H01R 4/44 | 439/413 |
| 4,526,428 A * | 7/1985 | Sachs | H02G 7/053 | 24/115 R |
| 4,550,965 A * | 11/1985 | Izraeli | H01R 4/2408 | 439/284 |
| 4,662,035 A * | 5/1987 | Hatfield | E04H 17/06 | 24/135 R |
| 4,684,196 A * | 8/1987 | Smith | H01R 4/2408 | 439/411 |
| 4,707,051 A * | 11/1987 | Hall | H01R 4/44 | 439/781 |
| 4,764,131 A * | 8/1988 | Beinhaur | H01R 4/44 | 439/781 |
| 4,915,653 A * | 4/1990 | Mair | H01R 4/44 | 439/781 |
| 5,015,198 A * | 5/1991 | Delin | H01R 4/44 | 439/411 |
| 5,302,144 A * | 4/1994 | Francois | H01R 4/2408 | 439/271 |
| 5,342,224 A * | 8/1994 | Lefavour | H01R 4/44 | 439/781 |
| 5,470,183 A * | 11/1995 | Swick | H01R 4/44 | 411/160 |
| 5,595,512 A * | 1/1997 | Langdon | H01R 4/34 | 439/782 |
| 5,658,108 A * | 8/1997 | Swick | H01R 4/44 | 411/160 |
| 5,692,930 A * | 12/1997 | Garver | H01R 4/44 | 439/781 |
| 5,704,816 A * | 1/1998 | Polidori | H01R 4/44 | 403/391 |
| 5,752,860 A * | 5/1998 | Greaves | H01R 4/44 | 439/100 |
| 5,816,866 A * | 10/1998 | Langdon | H01R 4/34 | 439/782 |
| 5,827,028 A * | 10/1998 | Swick | H01R 4/44 | 411/160 |
| 6,004,166 A * | 12/1999 | Cardas | H01R 27/02 | 439/781 |
| 6,082,942 A * | 7/2000 | Swick | H01R 4/304 | 411/160 |
| 6,086,406 A * | 7/2000 | Francois | H01R 4/2408 | 439/402 |
| 6,106,323 A * | 8/2000 | Elisei | H01R 4/2408 | 439/395 |
| 6,136,002 A * | 10/2000 | Shih | A61B 17/7044 | 606/250 |
| 6,142,836 A * | 11/2000 | Deckmann | H01R 12/515 | 439/801 |
| 6,264,492 B1 * | 7/2001 | LaLaouna | H01R 4/2408 | 439/402 |
| 6,388,216 B1 * | 5/2002 | Puhalla | H01R 4/44 | 200/284 |
| 6,725,524 B2 * | 4/2004 | Lin | H02K 5/225 | 29/596 |
| 6,926,543 B2 * | 8/2005 | Poh | H01R 11/05 | 439/107 |
| 6,976,857 B1 * | 12/2005 | Shukla | H01R 4/46 | 439/100 |
| 7,140,887 B2 * | 11/2006 | Poh | H01R 11/05 | 439/107 |
| 7,182,653 B1 * | 2/2007 | Hoxha | H01R 4/44 | 439/782 |
| 7,309,263 B2 * | 12/2007 | Copper | H01R 4/5091 | 439/284 |
| 7,387,546 B2 * | 6/2008 | Copper | H01R 4/38 | 174/94 S |
| 7,494,385 B2 * | 2/2009 | Copper | H01R 4/5091 | 439/770 |
| 7,524,217 B2 * | 4/2009 | Copper | H01R 4/5091 | 174/94 S |
| 7,666,024 B2 * | 2/2010 | De France | H01R 4/4872 | 439/479 |
| 7,677,933 B2 * | 3/2010 | Copper | H01R 4/5091 | 174/94 S |
| 7,862,390 B2 * | 1/2011 | Copper | H01R 4/5091 | 439/781 |
| 7,993,169 B1 * | 8/2011 | Hoxha | H01R 4/5091 | 439/781 |
| 8,272,904 B2 * | 9/2012 | Copper | H01R 4/5091 | 439/781 |
| 8,469,721 B2 * | 6/2013 | Mitchell | H01R 4/44 | 439/66 |
| 8,678,852 B2 * | 3/2014 | Rineau | H01R 4/2408 | 439/402 |

(56) References Cited

U.S. PATENT DOCUMENTS

| | | | |
|---|---|---|---|
| 8,864,504 B1* | 10/2014 | Gretz | H01R 4/66 439/100 |
| 8,940,020 B2* | 1/2015 | Rathbun | A61B 17/7049 606/250 |
| 8,998,956 B2* | 4/2015 | George | A61B 17/56 606/250 |
| 2008/0050987 A1* | 2/2008 | Copper | H01R 4/38 439/781 |
| 2012/0021658 A1* | 1/2012 | La Salvia | H01R 4/44 439/781 |
| 2015/0280334 A1* | 10/2015 | McPheeters | H02S 40/34 439/573 |

* cited by examiner

SOLAR PANEL GROUNDING LUG ASSEMBLIES AND SYSTEMS

CROSS-REFERENCE TO RELATED APPLICATIONS

This application claims the benefit of U.S. Provisional Patent Application No. 61/971,977, filed Mar. 28, 2014, the disclosure of which is incorporated by reference herein in its entirety.

BACKGROUND

Solar cell panels (also referred to as solar cell modules) are an increasingly popular means of generating renewable power, and recently there has been a wide proliferation of solar projects of all sizes, from small residential installations to large utility scale power production. Current solar cell panels are typically composed of photovoltaic solar cells encased in a rigid supporting frame. When installed, these solar cell panels can be supported by a racking system.

Solar panel racking systems must be properly grounded to remain safe and in compliance with local and federal regulations. Various devices have been used to provide electrical grounding for solar panel racking systems. One class of devices used to ground solar panel racking systems include lugs that are fastened to a solar panel frame and connected to a grounding wire. The grounding wire may be fastened to the lug by tightening the bottom end of a set screw against the grounding wire, thereby pinning the grounding wire against the lug.

SUMMARY

Solar panel grounding lug assemblies and systems are disclosed. A grounding lug assembly may include a bottom member having a central portion, with a threaded aperture for receiving a fastener, and two flanges extending from the central portion. The flanges of the bottom member may be configured to slidably engage complimentary clip structures of a mounting rail of a solar panel racking system. The grounding lug assembly may further include a top member having a first side configured to contact the mounting rail, a second side configured to face away from the mounting rail, and a central portion with an aperture. A grounding wire channel may be formed on the second side of the top member proximate to the aperture.

A threaded fastener, such a bolt or screw, may extend through the aperture in the top member to threadably engage the threaded aperture of the bottom member. Upon tightening the fastener, the top member may be clamped to the bottom member. A grounding wire resting in the grounding wire channel may be clamped between the grounding wire channel and a head of the fastener and/or a washer disposed between the grounding wire and the head of the fastener. Accordingly, the grounding wire and lug may be coupled to the racking rail using a single fastener that is not required to penetrate the rail.

These grounding lug assemblies may be provided in a solar panel racking system that includes a number of mounting rails. For each grounding lug, the bottom member may be slid into a corresponding clip structure of the mounting rail, and the top member may be placed atop the mounting rail. When the fastener is tightened, the top member may approach the bottom member, clamping the mounting rail therebetween thereby securing the grounding lug assembly to the mounting rail.

BRIEF DESCRIPTION OF THE DRAWINGS

The above and other objects and advantages of the invention will be apparent upon consideration of the following detailed description, taken in conjunction with the accompanying figures, in which like reference characters refer to like parts throughout, and in which.

DETAILED DESCRIPTION

Reference will now be made in detail to the embodiments of the present invention, examples of which are illustrated in the accompanying drawings.

Figure 1:
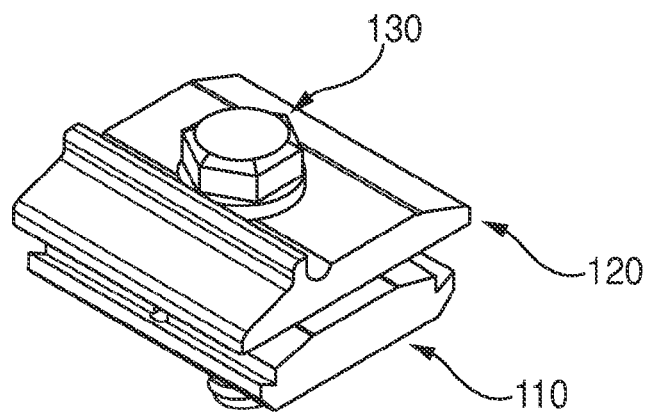
FIG. 1 shows a perspective view of a grounding lug assembly, in accordance with some embodiments.
Figure 2:
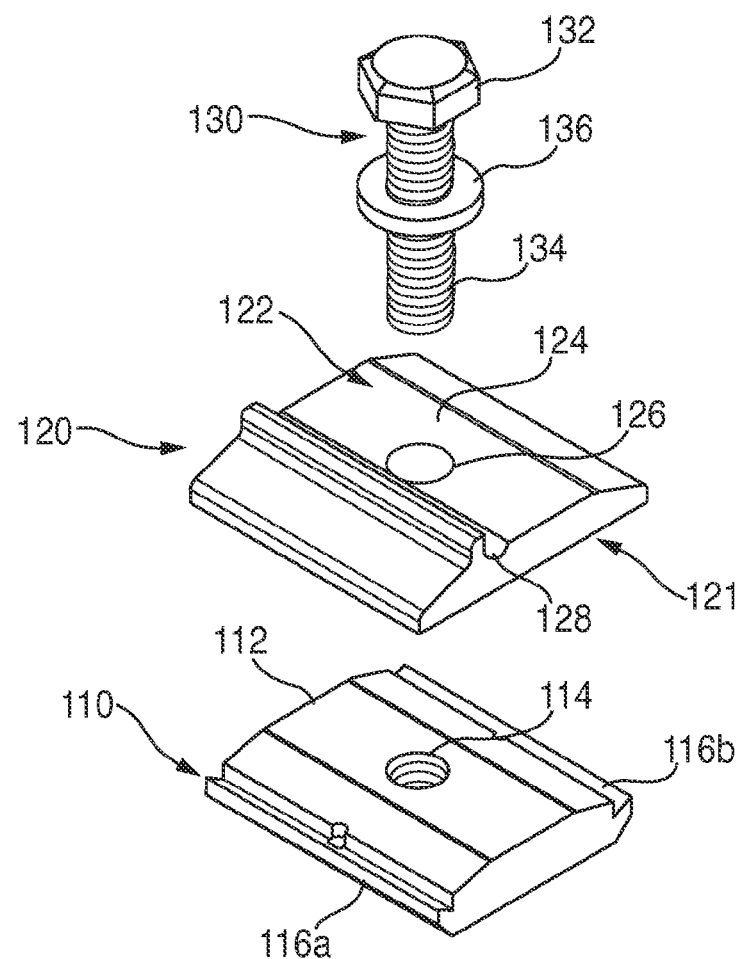
FIG. 2 shows an exploded view of the grounding lug assembly shown in FIG. 1, in accordance with some embodiments.

FIGS. 1 and 2 show a perspective view and an exploded view, respectively, of grounding lug assembly 100, in accordance with some embodiments. Grounding lug assembly 100 may include three main components, namely bottom member 110, top member 120, and fastener 130.

Bottom member 110 can include central portion 112 with threaded aperture 114 formed therein. Threaded aperture 114 may be configured to receive fastener 130, which may be any suitable threaded fastener, such as a thread or a screw, for example. Bottom member may also include flanges 116*a* and 116*b* for slidably engaging complimentary clip structures of a mounting rail of a solar panel racking system as described below with respect to FIG. 3. In some embodiments, central portion 112 may be substantially flat across its surface. In other embodiments, such as the embodiment depicted in FIG. 1, central portion 112 may include chamfered surfaces 112*a* and 112*b* extending from flanges 116*a* and 116*b*, respectively, to form a raised surface 116*c*. Surfaces 116*a*-116*c* can advantageously prevent bottom member 110 from twisting with respect to the mounting rail while reducing the distance between bottom member 110 and top member 120, as assembled into grounding lug assembly 100.

Top member 120 may include first side 121 configured to contact a mounting rail, second side 122 configured to face away from the mounting rail, and central portion 124 having aperture 126 formed therein. Further, top member 120 may include grounding wire channel 128 formed on second side 122 proximal to aperture 126.

Grounding wire channel 128 may be configured to receive a grounding wire for grounding at least one component of a solar panel racking system, as described in more detail below with respect to FIG. 3. In particular, grounding wire channel 128 may be a substantially U-shaped feature in order to receive a substantially cylindrically-shaped grounding wire. Grounding wire channel 128 may also include a flange, or "backstop," extending away from second side 122 to provide further security for a grounding wire received in grounding wire channel 128. In some embodiments, the flange may be formed on a side of grounding wire channel 128 distal from aperture 126. In general, the radial dimension of grounding wire channel 128 may be made sufficient to accept the lowest gauge grounding wire expected to be used within the solar panel racking system.

In some embodiments, first side 121 may be substantially flat to facilitate orientation of grounding wire channel 128 in substantially any direction with respect to the mounting rail. That is, top member 120 may be free to rotate with respect to bottom member 110 to allow any desired orientation of grounding wire channel 128. For example, top member 120 may be freely positionable parallel to a longitudinal dimension of the mounting rail, perpendicular to a longitudinal dimension of the mounting rail, or at any angle in between.

In other embodiments, first side 121 may include one or more features designed to prevent top member 120 from rotating with respect to the mounting rail. For example, as shown in FIG. 3, top member 120 may include a projection that complimentarily fits within a gap in the mounting rail, thereby preventing rotation. Such features may lock grounding wire channel 128 into substantially one or more distinct orientations with respect to the mounting rail without allowing top member 120 to be freely positionable with respect to the mounting rail. Accordingly, the projection may be geometrically shaped with opposing flat edges that, when arranged within the gap in the mounting rail, prevent twisting of top member 120 with respect to the mounting rail. The projection may include any suitable number of edges for this purpose (e.g., 2, 4, 6, or 8).

Fastener 130, which may be any suitable fastener, such as a bolt or screw, for example, may extend through aperture 126 to threadably engage threaded aperture 114 of bottom member 110. Fastener 130 may include head 132 and threaded portion 134. Washer 136 may optionally be provided between top member 120 and head 132. Upon tightening fastener 130 in threaded aperture 114, top member 120 may be clamped to bottom member 110, and a grounding wire resting in the grounding wire channel may be clamped between grounding wire channel 128 and head 132 and/or washer 136.

In some embodiments, threaded aperture 114 may not be threaded, and fastener 130 may instead be threadably coupled to a nut positioned on a side of bottom member 110 configured to face away from top member 120. In still other embodiments, both threaded aperture 114 and aperture 126 may be threaded.

The various components of grounding lug assembly 100 may be formed from any suitable material, such as aluminum, steel, plastic, or a composite, for example. In some embodiments, grounding lug assembly 100 may be formed in an aluminum extrusion process and plated or otherwise coated with tin to prevent corrosion at the aluminum/copper interface between grounding lug assembly 100 and the grounding wire.

Figure 3:
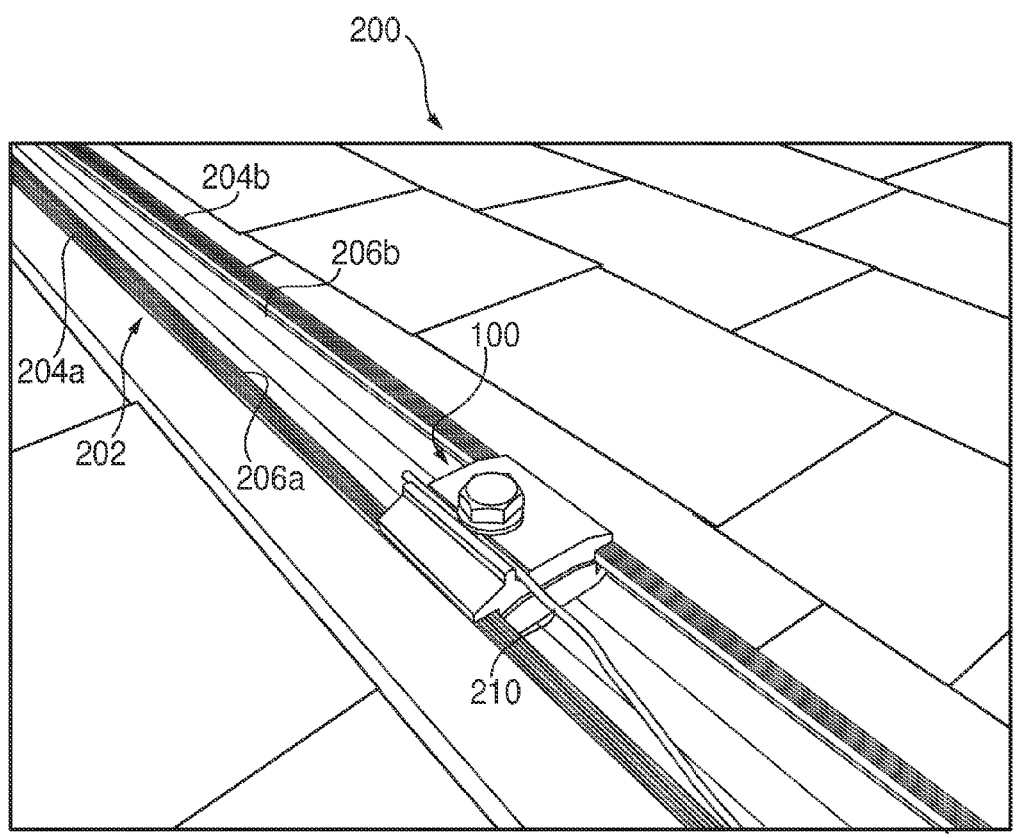
FIG. 3 shows a perspective view of a grounding lug assembly installed in a mounting rail, in accordance with some embodiments.

FIG. 3 shows a perspective view of a portion of solar panel racking system 200, in accordance with some embodiments. System 200 may include grounding lug assembly 100 installed in mounting rail 202. Mounting rail 202 may be formed from any suitable material, including aluminum, steel, plastic, or a composite, for example. Sidewall portions 204a and 204b of mounting rail 202 can include respective clip structures 206a and 206b at their distal ends. Clip structures 206a and 206b may be formed complimentarily to flanges 116a and 116b of grounding lug assembly 100, such that bottom member 110 can slidably couple to mounting rail 202. That is, bottom member 110 may be confined laterally and vertically with respect to mounting rail 202 while being permitted to move longitudinally along its length.

Grounding wire 210 may be placed within grounding wire channel 128 and fastened in place between head 132 and/or washer 136 of fastener 130 and grounding wire channel 128.

Figure 4:
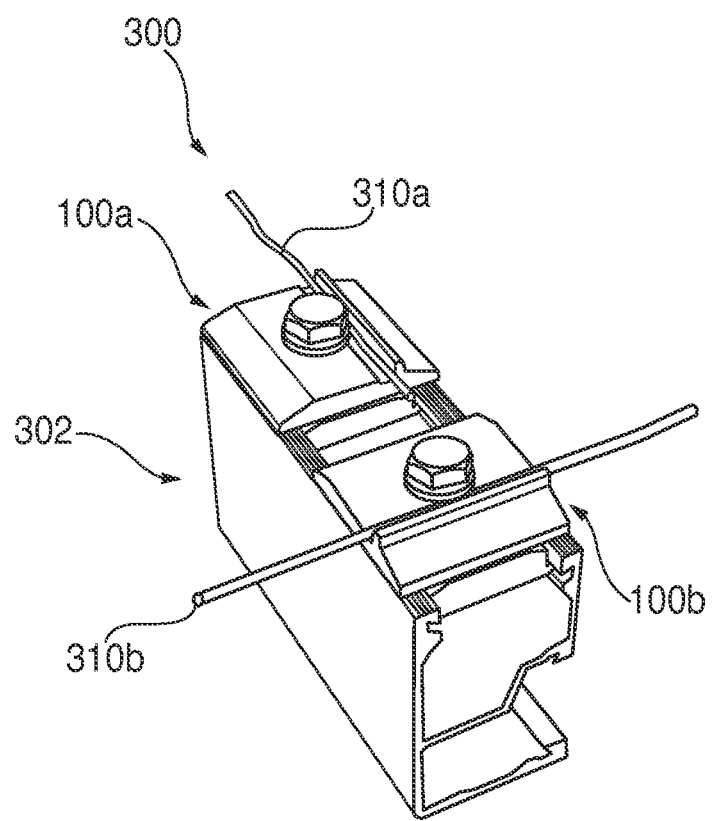
FIG. 4 shows a perspective view of two grounding lug assemblies installed in a mounting rail, in accordance with some embodiments.

FIG. 4 shows a perspective view of a portion of solar panel racking system 300, in accordance with some embodiments. System 300 may be similar to system 200 of FIG. 3, except that system 300 includes two grounding lug assemblies 100a and 100b installed in mounting rail 302. In particular system 300 illustrates that the grounding lugs disclosed herein may be adjusted to allow any desired orientation of the grounding wire channel. FIG. 4 shows grounding wires 310a and 310b oriented at substantially right angles with respect to each other as a consequence of grounding lug assemblies 100a and 100b being so oriented.

While there have been described solar panel grounding lugs assemblies and systems, it is to be understood that many changes may be made therein without departing from the spirit and scope of the invention. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The described embodiments of the invention are presented for the purpose of illustration and not of limitation.

What is claimed is:

1. A solar panel racking system, comprising:
    a mounting rail comprising two opposing sidewalls having clip structures formed at the end thereof; and
    a grounding lug assembly, comprising:
        a bottom member comprising flanges slidably coupled to the clip structures of the mounting rail;
        a top member engaging the mounting rail comprising a grounding wire channel; and
        a fastener inserted through aligned apertures of the bottom member and the top member, the fastener comprising a clamping feature extending at least partially over the grounding wire channel.

2. The solar panel racking system of claim 1, wherein the fastener clamps the bottom member and the top member to the mounting rail.

3. The solar panel racking system of claim 1, further comprising:
    a grounding wire received in the grounding wire channel.

4. The solar panel racking system of claim 3, the fastener comprising a clamping feature retaining the grounding wire in the grounding wire channel.

5. The solar panel racking system of claim 4, wherein the clamping feature comprises one of a head of the fastener and a washer disposed between the head and the grounding wire.

6. The solar panel racking system of claim 1, the top member comprising:
    a projection extending toward the bottom member, the projection comprising at least two flat opposing edges that engage the two opposing sidewalls to prevent the top member from twisting with respect to the mounting rail.

7. The solar panel racking system of claim 6, wherein the projection comprises at least four flat opposing edges that facilitate two or more distinct orientations of the grounding wire channel with respect to the mounting rail.

8. The solar panel racking system of claim 1, wherein the top member is fully rotatable with respect to the mounting rail.

9. The solar panel racking system of claim 1, wherein the bottom member comprises:

a chamfered surface extending from each flange; and
a raised surface extending between the chamfered surfaces.

10. The solar panel racking system of claim 1, wherein the aligned aperture of the bottom member threadably receives the fastener.

\* \* \* \* \*